(12) United States Patent
Mortensen

(10) Patent No.: US 9,384,168 B2
(45) Date of Patent: Jul. 5, 2016

(54) VECTOR MATRIX PRODUCT ACCELERATOR FOR MICROPROCESSOR INTEGRATION

(71) Applicant: Analog Devices Global, Hamilton (BM)

(72) Inventor: Mikael Mortensen, Lyngby (DE)

(73) Assignee: Analog Devices Global, Hamilton (BM)

( * ) Notice: Subject to any disclaimer, the term of this patent is extended or adjusted under 35 U.S.C. 154(b) by 233 days.

(21) Appl. No.: 13/914,731

(22) Filed: Jun. 11, 2013

(65) Prior Publication Data

US 2014/0365548 A1 Dec. 11, 2014

(51) Int. Cl.
*G06F 17/16* (2006.01)
*G06F 9/30* (2006.01)
*G06F 9/38* (2006.01)

(52) U.S. Cl.
CPC .............. *G06F 17/16* (2013.01); *G06F 9/3001* (2013.01); *G06F 9/3824* (2013.01); *G06F 9/3893* (2013.01)

(58) Field of Classification Search
None
See application file for complete search history.

(56) References Cited

U.S. PATENT DOCUMENTS

| | | | |
|---|---|---|---|
| 5,099,448 A | | 3/1992 | Myers et al. |
| 5,170,370 A | | 12/1992 | Lee et al. |
| 5,204,830 A | | 4/1993 | Wang et al. |
| 6,081,225 A | * | 6/2000 | Tsai ........................ G01S 7/285 342/175 |
| 6,477,555 B1 | * | 11/2002 | Hartung ........................ 708/420 |
| 6,571,268 B1 | | 5/2003 | Giacalone et al. |
| 6,675,187 B1 | | 1/2004 | Greenberger |
| 7,337,205 B2 | | 2/2008 | Sazegari |
| 7,461,115 B2 | | 12/2008 | Eberle et al. |
| 7,792,895 B1 | | 9/2010 | Juffa et al. |
| 8,027,587 B1 | | 9/2011 | Watts |
| 8,051,124 B2 | | 11/2011 | Salama et al. |
| 8,078,661 B2 | | 12/2011 | Mukaida et al. |
| 8,176,110 B2 | | 5/2012 | Eberle et al. |
| 8,195,735 B2 | | 6/2012 | Hansen et al. |
| 8,271,571 B2 | | 9/2012 | Matsuyama et al. |
| 8,325,403 B1 | | 12/2012 | Mesh et al. |
| 9,153,230 B2 | * | 10/2015 | Maaninen ............... G10L 15/16 |
| 2003/0088599 A1 | * | 5/2003 | Hou ...................... G06F 17/147 708/402 |
| 2004/0122887 A1 | | 6/2004 | Macy |
| 2004/0243657 A1 | | 12/2004 | Goren et al. |
| 2005/0027773 A1 | * | 2/2005 | Machnicki .......... G06F 7/49921 708/523 |
| 2005/0125477 A1 | | 6/2005 | Genov et al. |

(Continued)

FOREIGN PATENT DOCUMENTS

CN 101630178 11/2011
DE 102004014658 7/2010

(Continued)

*Primary Examiner* — David H Malzahn
(74) *Attorney, Agent, or Firm* — Patent Capital Group

(57) ABSTRACT

In at least one example embodiment, a microprocessor circuit is provided that includes a microprocessor core coupled to a data memory via a data memory bus comprising a predetermined integer number of data wires (J); the single-ported data memory configured for storage of vector input elements of an N element vector in a predetermined vector element order and storage of matrix input elements of an M×N matrix comprising M columns of matrix input elements and N rows of matrix input elements; a vector matrix product accelerator comprising a datapath configured for multiplying the N element vector and the matrix to compute an M element result vector, the vector matrix product accelerator comprising: an input/output port interfacing the data memory bus to the vector matrix product accelerator; a plurality of vector input registers for storage respective input vector elements received through the input/output port.

31 Claims, 7 Drawing Sheets

(56) References Cited

U.S. PATENT DOCUMENTS

| | | | |
|---|---|---|---|
| 2005/0216702 A1* | 9/2005 | Paolucci et al. | 712/35 |
| 2005/0235025 A1* | 10/2005 | Aldrich | G06F 7/5443 |
| | | | 708/523 |
| 2009/0024685 A1* | 1/2009 | Salama et al. | 708/607 |
| 2011/0055517 A1 | 3/2011 | Eichenberger et al. | |
| 2012/0215826 A1 | 8/2012 | Hansen et al. | |
| 2012/0278376 A1 | 11/2012 | Bakos | |
| 2014/0067895 A1* | 3/2014 | Wang | G06F 7/483 |
| | | | 708/501 |
| 2014/0365548 A1* | 12/2014 | Mortensen | 708/523 |
| 2015/0199963 A1* | 7/2015 | Maaninen | G10L 15/28 |
| | | | 704/232 |

FOREIGN PATENT DOCUMENTS

| | | |
|---|---|---|
| EP | 0186958 | 6/1992 |
| WO | 9013866 | 11/1990 |
| WO | 03/021423 | 3/2003 |
| WO | 2008037975 | 5/2009 |

* cited by examiner

US 9,384,168 B2

VECTOR MATRIX PRODUCT ACCELERATOR FOR MICROPROCESSOR INTEGRATION

TECHNICAL FIELD OF THE DISCLOSURE

The present disclosure relates generally to microprocessors and, more particularly, to a vector matrix product accelerator for microprocessor integration.

BACKGROUND

Efficient computation of signed vector inner products (SVIPs) in terms of computing time and power consumption is of significant value in numerous Digital Signal Processing algorithms and application, which rely heavily on vector matrix multiplications. SVIP intensive applications are, for example, Neural Net coefficient matrixes, transition matrixes of Hidden Markov Models and graph matrices of Factor Graphs. Since the datapaths of traditional DSP and microprocessor cores are ill suited for efficient SVIP computations it is highly beneficial to add a customized hardware data path for this purpose like the present vector matrix product accelerator to reduce the computational load of the data path of the DSP core or microprocessor core.

Furthermore, the interface between the present vector matrix product accelerator and the data bus of a single ported data memory system or area with limited data transfer bandwidth is important to provide efficient integration between the vector matrix product accelerator and an existing data memory bus of the DSP or microprocessor core. This interface is important to transfer a large number of input matrix elements and/or input vector elements to the vector matrix product accelerator in a minimum of bus cycles of the single ported data memory. Hence, it is important to enable efficient parallel or simultaneous operation between present vector matrix product accelerator and existing DSP or microprocessor datapaths to dramatically improve multiplication throughput of the total microprocessor circuit.

OVERVIEW

A first aspect of the disclosure relates to a microprocessor circuit including: a microprocessor core coupled to a data memory via a data memory bus comprising a predetermined integer number (J) of data wires, the data memory configured for storage of vector input elements of an N element vector in a predetermined vector element order and storage of matrix input elements of a matrix comprising M columns of matrix input elements and N rows of matrix input elements, a vector matrix product accelerator comprising a multiple MAC datapath configured for multiplying the N element vector and the matrix to compute an M element result vector, the vector matrix product accelerator includes:

an input/output port interfacing the data memory bus to the vector matrix product accelerator, a plurality of vector input registers for storage respective input vector elements received through the input/output port, where each input vector element is represented by a first predetermined number of bits (X), a plurality of matrix input registers for storage of respective matrix input elements received through the input/output port, where each matrix input element is represented by a second predetermined number of bits (Y), a number of digital multiply-accumulate circuits comprising respective binary multiplicand inputs coupled to the respective vector input registers for receipt of respective input vector elements and comprising respective binary multiplier inputs coupled to the matrix input registers for receipt of respective matrix input elements to produce respective intermediate multiplication values, a binary adder circuit comprising one or more binary adders configured to sum a plurality of intermediate multiplication values computed through respective multiplier cycles to produce a result vector element of the M element result vector;

In certain embodiments, the number of digital multiply-accumulate circuits substantially equals the predetermined integer number of data wires (J) divided by the second predetermined number of bits (Y) of each of the matrix input elements. In addition, each of I, J, M, N, X and Y being positive integers.

The term "substantially" in the context of the number of digital multiply-accumulate circuits substantially equals J divided by Y means that the number of digital multiply-accumulate circuits equals J divided by Y rounded to the nearest integer.

In one example embodiment, the predetermined integer number of data wires (J) divided by the second predetermined number of bits (Y) of each of the matrix input elements is an integer number such as 2, 4, 6 or 8.

The topology of the present vector matrix product accelerator provides an optimal or near optimal match to the typical a priori given respective bit-widths of the single-ported data memory bus and the matrix input elements because the number of digital multiply-accumulate circuits (MACs) substantially equals the number of data wires (J), or the bit width, of the data memory bus divided by the number of bits (Y), or bit width, of matrix input elements. This optimum or near optimum match is of considerable value in connection with designing and integrating the present vector matrix product accelerator in a given microprocessor core architecture because neither the width of the data memory bus nor the bit width of the matrix input elements can normally be changed. These are for all practical purposes a priori fixed values defined by the type of programmable microprocessor/DSP core architecture and numerical requirements set by a particular signal processing application(s) associated with the N×M matrix. Ordinarily, a microprocessor/DSP core is designed as memory starved system in the sense that the number of available MACs is disproportionate to the available memory bandwidth of the data memory. Microprocessors/DSP core architectures are memory starved because the performance of the main software applications or routines are capable of circumventing this limitation by either not utilizing the available MACs or by ways of increasing end-to-end system latency. These circumvention methodologies unfortunately lead to significant performance degradations of the executed processing applications. The MACs available in a given microprocessor/DSP core architecture are typically linked to either of 16-bit, 24-bit, 32-bit or 64-bit base data types, all of which will be sub-optimal for systems where the designated precision does not match the base data type of the given architecture.

It is a significant challenge in designing a vector matrix product accelerator that its performance is linked to the available data memory bandwidth. The memory bandwidth tends to dominate the performance, i.e. number of vector matrix input element multiplications per second, as a theoretical optimal design would read every vector element and every matrix element only once. Because the number of matrix elements is considerably larger than the number of vector elements, performance of the vector matrix product accelerator will largely be determined by the bit width of the matrix input elements versus the available data memory bandwidth. A consequence of these facts is that the optimal number of parallel digital multiply-accumulate circuits can be found as the bit width of data memory bus (J) divided with the bit width of the matrix input elements or coefficients (Y).

Exemplary values for the bit widths of the matrix input elements would be 8, 12 or 16 on a 32-bit data memory bus structure which results in a quad (4), 3 or 2 MAC topology, respectively, of the vector matrix product accelerator. An example where J divided by Y is a non-integer value is a bit width of 12 of each of the matrix input elements on a 64-bit memory data bus, which results in a non-integer ratio 5.33. When rounded to the nearest integer, this ratio results in 5 MAC topology of the vector matrix product accelerator. The significant multiplication performance boost provided by the present dedicated or custom vector matrix product accelerator is supported by the fact that the actual bit width of matrix input elements can be optimized and stored in a predetermined packaged format in the data memory as described in further detail below in conjunction with the previously mentioned typical memory starved nature of microcontroller/DSP system architectures.

The predetermined integer number of data wires (J) preferably is a power of 2 such as 8, 16, 32, 64 and 128 and each of the matrix input elements may be represented by 8 bits or 16 bits, i.e. the bit width Y. However, the bit width Y of each of the matrix input elements may vary considerably depending on the characteristics of a particular signal processing algorithm or application to be executed on the vector matrix product accelerator. However, in numerous embodiments, the bit width Y is a power of 2 for example 8, 16 or 32. J may be set to 32 and Y set to either 8 or 16 leading to the provision of 4 and 2, respectively, digital multiply-accumulate circuits in vector matrix product accelerator of the microprocessor circuit.

The single-ported data memory may comprise well-known memory types such as RAM, EEPROM or flash memory or any combination of these memory types. The single-ported data memory is preferably accessible to either the microprocessor core and/or the vector matrix product accelerator for reading input data to the vector accelerator from the designated memory space or spaces of the single ported data memory or writing output data computed by the vector accelerator to the designated memory space or spaces of the single ported data memory. In one embodiment of the disclosure, the microprocessor core is adapted to both fetch input data from the single ported data memory and write the input data, such as the vector input elements of the N element vector and the respective matrix input elements of the M columns and the N rows, to the vector matrix product accelerator through its input/output port. [Note that the term "fetching" includes any activity associated with retrieving, accessing, identifying, obtaining, etc.] In an alternative embodiment, the vector matrix product accelerator comprises a controller or sequencer that is configured to fetch the above-mentioned input data from the designated memory spaces of the single ported data memory through the input/output port without any intervening action by the microprocessor core. In the latter embodiment, the vector matrix product accelerator may comprise a number of pointer registers holding respective pointer addresses to the above mentioned input data such as the vector input elements and the matrix input elements of the M×N matrix allowing the controller to read out the desired input data by reference to the memory addresses indicated by the pointer addresses. The vector matrix product accelerator may in addition comprise a pointer registers holding a pointer address to the memory space of the single-ported data memory which is allocated for storage of the result vector elements of the M element result vector once it has been computed. The respective pointer addresses to the above-mentioned input and output data entities may be written by the microprocessor core to the pointer registers in connection with an initialization procedure executed by the microprocessor core during microprocessor system power-on or boot. Alternatively, the pointer addresses may be written by the microprocessor core in connection with an initialization routine for a particular application or software routine utilizing the vector matrix product accelerator. Clearly, other types of input/output data or configuration data specifying certain data processing characteristics of the vector matrix product accelerator can additionally be loaded during the initialization routine.

The single-ported data memory may comprise data memory that is integrated with the microprocessor circuit on a common a semiconductor die (on-chip data memory) and connected to the microprocessor core via an on-chip deposited data memory bus. The single-ported data memory may alternatively reside on an external dedicated memory chip or comprise a combination of both of these types of data memory, i.e. on-chip and off-chip data memory.

According to another example embodiment of the present microprocessor circuit, the single-ported data memory is configured to store the matrix input elements of the matrix in column order such that matrix input elements of each column of the M columns are held in consecutive memory locations. In this manner, the matrix input elements of all M columns of elements may be placed in consecutive memory locations or addresses of the single-ported data memory. The column ordered arrangement is advantageous compared to a row ordered arrangement of the matrix input elements. The column ordered arrangement of matrix input elements uses only a single local accumulator/adder independent of the number of digital multiply-accumulate circuits while the row ordered arrangement uses one local accumulator/adder per of digital multiply-accumulate circuit. For the column ordered arrangement the number of separate adders in an adder tree can be reduced using design features from digital multiplier designs by building a carry-save (CS) or compression adder tree as explained in further detail below in connection with FIG. 4.

The vector matrix product accelerator may comprises a buffer memory coupled to the binary adder circuit for receipt and temporary storage of at least one result vector element of the M element result vector. The buffer memory may comprise register file or single-ported or dual-ported RAM. The memory capacity of the buffer memory is preferably sufficiently large to simultaneously store all elements of the M element result vector since this feature is capable of reducing activity on the data memory bus of the microprocessor system when the entire M element result vector is written to the allocated memory space or area of the single ported data memory through the input/output port in a single or few transmission sessions.

An advantageous embodiment of the above-discussed buffer memory comprises simultaneously operable first and second separate single-ported memory segments, where the first memory segment is configured for storing odd numbered result vector elements and the second memory segment is configured for storing even numbered result vector elements. The first and second separate single-ported memory segments for storage of odd and even order result vector elements remove the need for a dual-ported buffer memory device for supporting simultaneous writing and reading of intermediate multiplication values of the result vector elements to the buffer memory. The separate single-ported memory segments allows a controller or sequencer of the vector matrix product accelerator to write intermediate multiplication values, and the final result vector element, of an even or odd order result vector element to one memory segment while parellelly reading opposite result vector elements out of the other memory segment for further processing.

The binary adder circuit preferably comprises at least first and second operand inputs such the first operand input may receive a current intermediate multiplication value while the second input receives a previous intermediate multiplication value. In this manner, the binary adder circuit is capable of summing the plurality of intermediate multiplication values produced through the plurality of multiplier cycles in connection with the computation of each result vector element of the M element result vector.

The vector matrix product accelerator may comprise a multiplexer comprising a multiplexer output coupled to the second input of the binary adder circuit. The multiplexer may be utilized to selectively write the odd and even order intermediate multiplication values stored in the respective single-ported memory segments to the second input of the binary adder circuit.

The vector matrix product accelerator preferably comprises a rounding circuit comprising a rounder input for receipt of the result vector elements for example from the previously discussed memory buffer. The rounding circuit is configured for generation of corresponding rounded values of the result vector elements. The result vector elements may generally be represented at a third predetermined bit width for example in the buffer memory and the rounding circuit configured to truncate values of each of the result vector elements to a fourth predetermined bit width smaller than the third predetermined bit width. The third predetermined bit width of each of the computed result vector elements may be significantly larger than the combined bit width of a matrix input element and a vector input element due to the often large number of accumulative additions of intermediate multiplication values performed by the digital multiply-accumulate circuits during computation of each result vector element as discussed above. By rounding or truncating the result vector elements the latter can be transmitted to, and stored in, the single ported data memory with less power consumption and using fewer data bus cycles compared to the unrounded or initial result vector elements.

Generally, the bit width (P) of each result vector element may be about:

$X+Y+\text{Log}_2$(Number of accumulative additions) to avoid losing any numerical precision of the result vector element, where Y is the bit width of each matrix input element, X is the bit width of each vector input element and N is the number of rows of the N×M matrix. Hence, if X=8; Y=16 and N=1024 the result vector elements should have a bit width of: $8+16+\text{Log}_2(1024)=34$ to avoid losing numerical precision. The rounding circuit may be configured to round this initial 34 bit width representation of the result vector elements by truncating the result vectors to a smaller bit width for example to 32 bits, 24 bits or 16 bits etc. The truncated result vector elements can be transmitted to, and stored in, the single ported data memory with less power consumption and using fewer data bus cycles compared to the unrounded or initial result vector elements.

The vector matrix product accelerator may further comprise a saturation circuit comprising upper and lower saturation thresholds and a saturate input for receipt of the result vector elements. The saturation circuit is further configured for generation of saturated values of the result vector elements in accordance with the upper and lower saturation thresholds. The saturation circuit may limit maximum and minimum values of the result vector elements to stay within certain pre-set bounds, which may be advantageous to prevent numerical overflow or underflow problems in the vector matrix product accelerator. Certain embodiments of the vector matrix product accelerator may comprise both the rounding and saturation circuits operating on the unrounded or initial result vector elements.

The vector matrix product accelerator preferably comprises a controller or sequencer operatively coupled to the input/output port, the plurality of vector input registers, the plurality of matrix input registers, the number of digital multiply-accumulate circuits and the binary adder circuit to control data manipulation operations thereof. The sequencer may comprise an appropriately configured digital state machine for example comprising combinatorial and sequential digital logic circuitry.

A second aspect of the disclosure relates to an integrated semiconductor die or chip comprising a microprocessor circuit according to any of the above-described embodiments thereof.

A third aspect of the disclosure relates to a method of operating a vector matrix product accelerator of a microprocessor circuit to multiply an N element vector and an M×N matrix, comprising:
a) fetching a plurality of vector input elements of the N element vector from a single-ported data memory, where the vector input elements are stored in a first predetermined address space in a predetermined vector element order,
b) temporarily storing the vector input elements in respective vector input registers, where each vector input element is represented by a first predetermined number of bits (X),
c) fetching a plurality of matrix input elements of the M×N matrix from of the single-ported data memory, where the plurality of matrix input elements are stored in a second predetermined address space in a predetermined order,
d) storing (e.g., temporarily) the plurality of matrix input elements in respective matrix input registers, where each matrix input element is represented by a second predetermined number of bits (Y),
e) parallelly applying respective pairs of vector input elements and matrix input elements to a plurality of digital multiply-accumulate circuits,
f) parallelly multiplying the respective pairs of vector input elements and matrix input elements by the plurality of digital multiply-accumulate circuits to produce an intermediate multiplication value,
g) repeating a)-f) a plurality of times through a plurality of multiplier cycles for successive vector input elements of the N element vector and successive matrix input elements of the M×N matrix to compute a plurality of intermediate multiplication values,
h) adding the plurality of intermediate multiplication values in a binary adder circuit to produce a result vector element of an M element result vector;
each of M, N, X and Y being positive integers.

According to one example embodiment of the present methodology of operating the vector matrix product accelerator, the plurality of matrix input elements and the plurality of vector input elements are fetched through a data memory bus comprising a predetermined integer number (J) of data wires. The number of parellelly operating digital multiply-accumulate circuits substantially equals the predetermined integer number of data wires (J) divided by the second predetermined number of bits (Y) of each of the matrix input elements as discussed in detail in connection with the first aspect of the disclosure.

The present methodology may further comprise:

i) writing the matrix input elements of each column of the M×N matrix to the second predetermined address space in column order such that the matrix input elements of each of the M columns are held in consecutive memory locations of the predetermined address space. The advantages associated with the column ordered arrangement of the matrix input elements have previously been discussed.

The present methodology may further comprise:

j) writing at least one result vector element of the M element result vector from the binary adder circuit to a buffer memory of the vector matrix product accelerator for temporary storage. Preferably, all M result vector elements are temporarily stored in the buffer memory for subsequent transmission to the single-ported data memory. Hence, one embodiment of the present methodology of operating the vector matrix product accelerator comprises:

l) writing the result vector elements of the M element result vector from the buffer memory to the data memory through the bus input/output port, m) storing the result vector elements in a third predetermined address space of the single-ported data memory.

BRIEF DESCRIPTION OF THE DRAWINGS

Example embodiments of the disclosure will be described in more detail in connection with the append drawings in which.

DESCRIPTION OF EXAMPLE EMBODIMENTS

Figure 1:
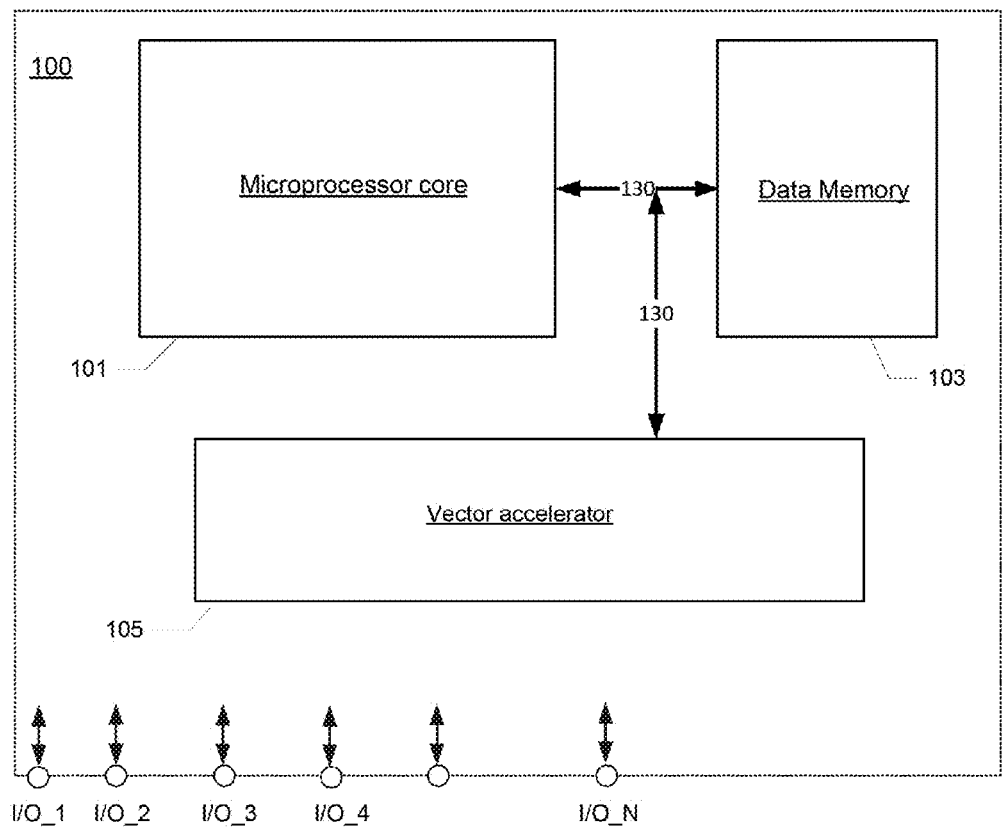
FIG. 1 is a simplified schematic block diagram of a microprocessor circuit comprising a microprocessor core and a vector matrix product accelerator in accordance with one example embodiment of the present disclosure.

FIG. 1 is a simplified schematic block diagram of a microprocessor circuit 100 comprising a microprocessor core 101 and a vector matrix product accelerator 105 in accordance with one example embodiment of the present disclosure. The microprocessor core 101 is coupled to a single-ported data memory 103 via a data memory bus 130. The data memory bus 130 comprises 32 data wires in the present embodiment of the disclosure, but other embodiments may possess a different integer number of data wires such as 8, 16, 64 and 128. The microprocessor core 101 may comprise a standard ARM Cortex-M4 processor core available from ARM Holdings or any other software programmable proprietary or standard microprocessor and/or DSP core. The single-ported data memory 103 may be integrated with the microprocessor core 101 and the vector matrix product accelerator 105 on a common a semiconductor die or substrate as schematically indicated on the figure. Alternatively, the single-ported data memory 103 may arranged on a separate dedicated memory chip accessible via a suitable external memory interface or implemented as a combination of both, i.e. both on-chip and external (off-ship) data memory.

Microprocessor circuit 100 may be fabricated on a single semiconductor die fabricated in suitable digital semiconductor processes such as 0.35 µm, 0.18 µm or 0.065 µm CMOS. The single-ported data memory 103 may for example comprise RAM, EEPROM and flash memory or any combination of these memory types. The microprocessor circuit 100 may comprise a plurality of externally accessible I/O pins or pads, schematically illustrated by I/O_1, I/O_2, I/O_3, I/O_4 and I/O_N, for providing data connectivity to external circuits and devices such as sensors, displays, keypads etc. of a piece of electronic equipment. The piece of electronic equipment may comprise a portable terminal such as tablet, smartphone, mobile phone etc.

The present disclosure can relate to a microprocessor circuit comprising a vector matrix product accelerator. The vector matrix product accelerator functions as a dedicated math co-processor or accelerator for a standard/conventional or proprietary DSP core or microprocessor core of the microprocessor circuit. The vector matrix product accelerator comprises a plurality of digital multiply-accumulate circuits that are particularly well-suited for computation of signed vector inner products (SVIPs) in connection with multiplication of an N element input vector and a M×N matrix comprising M columns of input matrix elements and N rows of input matrix elements.

In at least one example embodiment, a microprocessor circuit includes a software programmable microprocessor core coupled to a single-ported data memory via a data memory bus. The data memory bus comprises a predetermined integer number (J) of data wires. The single-ported data memory is configured for storage of vector input elements of an N element vector in a predetermined vector element order, storage of matrix input elements of a matrix comprising M columns of matrix input elements, and N rows of matrix input elements. The microprocessor circuit comprises a vector matrix product accelerator comprising a multiple MAC datapath configured for multiplying the N element vector and the matrix to compute an M element result vector. The vector matrix product accelerator comprises a plurality of vector input registers for storage respective input vector elements, where each input vector element is represented by a first predetermined number of bits (X).

The vector matrix product accelerator further comprises a plurality of matrix input registers for storage of respective matrix input elements each represented by a second predetermined number of bits (Y). A number of digital multiply-accumulate circuits comprising respective binary multiplicand inputs coupled to the respective vector input registers for receipt of respective input vector elements and comprising respective binary multiplier inputs coupled to the matrix input registers for receipt of respective matrix input elements to produce respective intermediate multiplication values. A binary adder circuit is configured to sum a plurality of intermediate multiplication values computed through respective multiplier cycles to produce a result vector element of the M element result vector. The number of digital multiply-accumulate circuits substantially equals the predetermined integer number of data wires (J) divided by the second predetermined number of bits (Y) of each of the matrix input elements. Each of I, J, M, N, X and Y being positive integers.

In one example, the present vector matrix product accelerator comprises a multiple MAC datapath in which the number of digital multiply-accumulate circuits is optimally or near optimally tailored to a given number of data wires or bit-width of the data memory bus and a given bit-width of the input matrix elements. The respective bit widths of the data memory bus and the matrix elements are normally a priori fixed values defined by the architecture of the selected microprocessor or DSP core and various numerical designations imposed by the particular signal processing application(s) associated with the N×M matrix.

U.S. Pat. No. 8,051,124 B2 discloses according a matrix multiplication hardware module (also called a "core") that uses a variable number of multiplier-accumulator (MAC) units based on the number of data elements available for processing. The number of MAC units used during a multiplication of two matrices varies over time depending on the stage of the computation of the matrices. First and second data buses and supply data to and from the matrix multiplication hardware module. Each memory bank is dedicated to one of the two input matrices to be multiplied. The separate data buses can be read simultaneously by the multiplication hardware module. The disclosed multiplication hardware module may be implemented in FPGA technology or ASIC technology.

In the example of FIG. 1, single-ported data memory 103 is coupled to the vector matrix product accelerator 105, or vector accelerator, and the microprocessor core 101 via the shared data memory bus 130. The interconnection between the vector accelerator 105 and the single-ported data memory 103 allows the vector accelerator 105 to access, fetch and write the relevant data in the single-ported data memory 103 without intervention from the microprocessor core 101. This feature may lead to considerable power savings and reduction in computational load on the microprocessor core 101. The single-ported data memory 103 holds various input and output data that are read into, or read out of, the vector accelerator 105 as described in additional detail below. The vector accelerator 105 is via a customized multiple MAC (multiply-accumulate circuit) configured to multiply an N element vector and an M×N matrix leading to an M element result vector as described in additional detail below with reference to FIGS. 2A), 2B, and 3.

Furthermore, the microprocessor core 101 may comprise a datapath that operates in parallel to the customized multiple MAC of the vector accelerator 105 to provide high multiplication performance of the complete microprocessor circuit 100. A suitable bus arbitration of the data memory bus 130 to allow both the microprocessor core and the vector accelerator 105 to access the data memory 103 without collision and unacceptable wait states may be provided by a data bus port of the vector accelerator 105. Depending on a memory load profile of the specific application running on the microprocessor core 101, possible memory arbitration schemes comprises either a simple priority arbiter that grants the microprocessor core 101 memory access for a low memory load profile or a round robin arbiter for a high memory load profile. The vector accelerator 105 itself has a high load profile and consumes substantially 100% of the available memory bandwidth when active. According to one embodiment, the data memory 103 is divided into a plurality of sub-banks/blocks, which has considerable benefits by allowing the microprocessor core 101 and the vector accelerator 105 to access the data memory 103 in parallel using appropriate arbitration and software memory layout.

Microprocessor circuit 100 typically will comprise a number of additional circuits such as interrupt controllers, DMA controllers and channels, dedicated digital audio I/O ports such as I²S or SLIMbus based audio ports, serial data communication interfaces like SPI or as I²C etc. Vector accelerator 105 is capable of off-loading the microprocessor core 101 from the numerous repetitive multiplication operations in connection with the multiplication of the N element vector and the M×N matrix. This task is instead handled by the vector accelerator 105 such that the microprocessor core 101 may simply await for the completion of the vector matrix multiplication operation where the M element result vector has been written to a known address space of the data memory 103. Thereafter, the microprocessor core 101 may access the computed M element result vector and apply appropriate data manipulating or processing operations in accordance with a particular software application or routine. The datapath of the microprocessor core 101 may be configured for executing other operations, including mathematical operations, while awaiting the availability of a new M element result vector to exploit parallelism of the microprocessor circuit 100 and simultaneously engage all mathematical computational resources of microprocessor circuit.

Figure 2A:
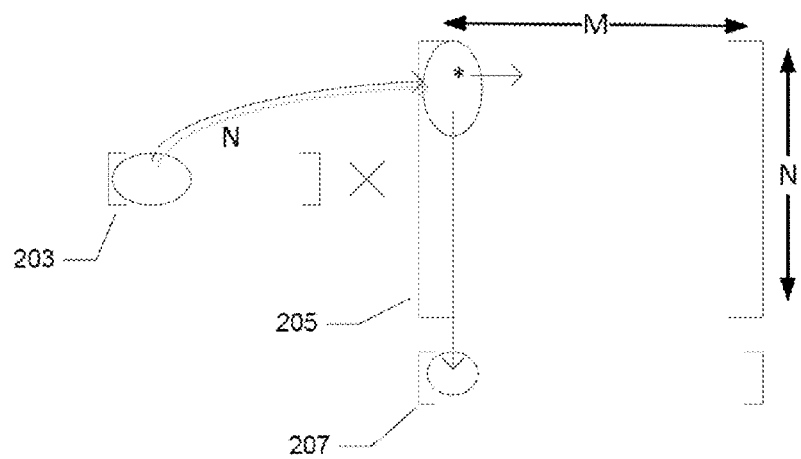
FIGS. 2A) and 2B) are schematic illustration of a multiplication operation between an N element vector and an M×N matrix leading to an M element result vector.
Figure 2B:
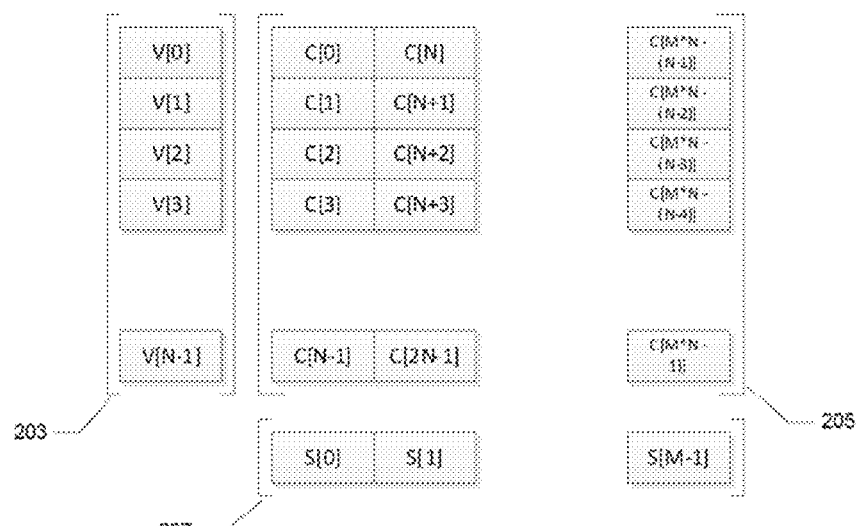

FIGS. 2A) and 2B) are schematic illustrations of the multiplication operation between an N element vector 203 and an M×N matrix 205 leading to an M element result vector 207. Each of M and N is a positive integer. FIG. 2A) illustrates how the vector input elements, or coefficient, are multiplied with respective ones of N matrix input elements of a first column of the M×N matrix 205 to compute a first result vector element, or coefficient, of the M element, or coefficient, result vector 207. This computation is schematically illustrated on FIG. 2B) where the multiplication of: V[0]*C[0]+V[1]*C[1]+V[2]*C[2] . . . V[N−1]*C[N−1] leads to the first result vector element S[0]. The second result vector element S[1] is computed by performing the corresponding multiplication operation between the N element vector and the second column of the M×N matrix 205. By proceeding progressivity through the residual columns (M−2) of the M columns of the M×N matrix 205, the successive computation of the residual result vector elements S[2], S[3], S[2] . . . S[M−1] of the M element result vector 207 is performed.

To facilitate addressing and read-out of the vector input elements and the matrix input elements these elements are preferably stored at suitable predetermined addresses and suitable predetermined order in the data memory 103. The memory access portion or data bus port of the vector accelerator 105 utilizes this address and order information to read the vector input elements into the vector accelerator 105 in appropriate order. The size or bit width of each of the vector input elements may vary depending on specific requirements of a particular algorithm or application, but may for example be anyone of 8, 16 or 32 bits. Hence, a single vector element may occupy between 1 and 4 bytes of the data memory. The size of the N element vector 203, i.e. the integer number (N) of individual vector input elements, may also vary considerably depending on the specific requirements of the particular algorithm or application to be executed. In a number of useful applications, the value of N lies between 32 and 1024. The N vector input elements are preferably arranged in consecutive memory addresses in a first predetermined address space of the data memory 103. Furthermore, if each of the vector input elements is larger than 8 bits, the individual portions of the vector element are preferably also arranged in a known order, e.g. successive order from MSB portion to LSB portion, to enable correct interpretation of the value of the vector element.

The size or bit width of each of the matrix input elements may vary depending on specific requirements of a particular algorithm or application, but may for example be 8 or 16 bits. The size of the M×N matrix 205 itself follows the selected value of N in the row dimension while the number columns, M, may vary depending on the specific requirements of a particular algorithm or application. In a number of useful applications, M is set to a value between 32 and 256. Verbal command recognition system is one exemplary algorithm or application and may be using cepstrum domain vector elements with a bit-width of 16 and a bit-width of 8 for matrix elements of a feature matrix. The cepstrum domain vector may comprise about 40 cepstrum or cepstral values, i.e. 40 vector input elements (N) which are compared against 250 neural network nodes leading to 250 columns (M) of matrix input elements of the M×N matrix 205. Another well-suited area of application for the present vector matrix product accelerator concerns biometric voice recognition systems where a recognition system may comprise about 4 seconds of recorded speech audio resulting in about 100 input vector elements (N) in form of cepstral values each with a bit-width of 16. These 100 cepstral domain values are compared against 50 matrix input elements (M) representing matching values with a bit-width of 16.

The matrix input elements or coefficients are preferably arranged in consecutive memory addresses of a second predetermined address space of the data memory 103. However, at least two different storage arrangements are possible: column ordered or row ordered. In a column ordered embodiment, the matrix input elements of the M×N matrix 205 are stored in column order such that matrix input elements of each column of the M columns are held in consecutive memory locations in the second predetermined address space. When one column, e.g. elements C[0], C[1], C[2], C[3] ... C[N−1] of the first column, is complete, the matrix input elements of an immediately following column e.g. C[N], are placed thereafter in consecutive memory locations of the second predetermined address space and so on in respect of C[N+1] C[N+2], C[N+3] ... C[2N−1] such that all M columns of matrix input elements are stored in consecutive column order. In the alternative row ordered embodiment, the matrix input elements of the M×N matrix 205 are stored in row order such that matrix input elements of each row of the N rows are held in consecutive memory locations within the second predetermined address space. When a row, e.g. elements C[0], C[N] ... C[M*N−(N−1)] of the first row, is complete, the respective matrix input elements of the immediately following row, e.g. C[1], C[N+1] ... C[M*N−(N−2)]], are placed thereafter in consecutive memory locations of the second predetermined address space such that all rows of matrix input elements of the N matrix rows becomes consecutively arranged. The choice between column ordered and row ordered organization of the matrix input elements has significant implications for the design and operation of the multiple MAC datapath of the vector accelerator 105 as discussed in further detail with reference to FIG. 4.

Figure 3:
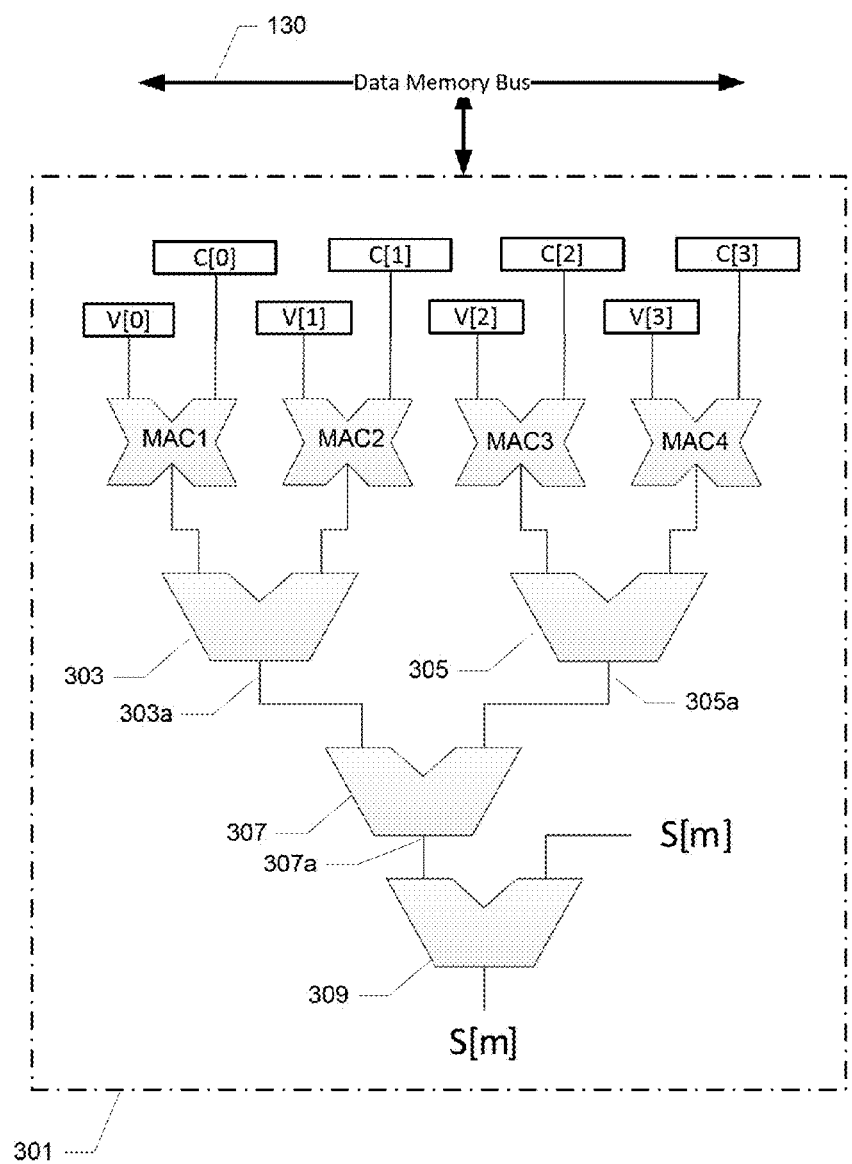
FIG. 3 is a simplified schematic block diagram of a multiple MAC data path of the vector matrix product accelerator in accordance with one example embodiment, FIGS. 4A) and 4B) are schematic illustrations of respective alternative N element vector and M×N matrix multiplication operations and their corresponding MAC datapath topologies.

FIG. 3 is a schematic block diagram of a multiple MAC data path 301 of the vector accelerator 105 in accordance with one example embodiment thereof. The multiple MAC data path 301 is optimized for previously discussed column ordered structure of the matrix input elements. The multiple MAC data path 301 comprises four parellelly operating digital multiply-accumulate circuits MAC1, MAC2, MAC3 and MAC4 in combination with respective adders 303 and 305. The multiple MAC data path 301 comprises four separate vector input registers V[0], V[1], V[2], V[3] which store respective ones of the previously discussed vector input elements in the selected bit width and binary representation for example 16 bit integer format. The values held in the separate vector input registers V[0], V[1], V[2], V[3] are applied to respective multiplicand inputs of the MAC1-MAC4. The multiple MAC data path 301 furthermore comprises four separate matrix input registers C[0], C[1], C[2], C[3] which store respective ones of the previously discussed matrix input elements in the selected bit width and binary representation for example 8 bit integer format. The coefficients or elements held in the separate matrix input registers C[0], C[1], C[2], C[3] are applied to respective multipliers inputs of MAC1-MAC4. Hence, each MAC is configured to digitally multiply an particular pair of vector and matrix input elements and produce an intermediate multiplication value at the output. In the present embodiment of the multiple MAC data path 301, respective intermediate multiplication values are provided at the respective outputs 303a, 305a, 307a of binary adders 303, 305 and 307. The first binary adder 303 is configured for adding the intermediate multiplication values delivered by MAC1 and MAC2 while the second binary adder 305 is configured for adding the intermediate multiplication values delivered by MAC3 and MAC4. The design of these binary adders is adapted to the chosen bit widths and binary representation of the vector and matrix input elements. The adder outputs 303a, 305a of the first and second binary adder 303, 305 preferably represent the intermediate multiplication values with a bit width larger than the combined bit width of the vector and matrix input elements, i.e. larger than 8+16 bits=24 bits, to maintain high numerical precision of these intermediate multiplication values. The intermediate multiplication values delivered by the first and second binary adder 303, 305 are thereafter added in the third binary adder 307 to produce another intermediate multiplication value at the output 307a representing the entire sum of the multiplication of the vector and matrix input elements held in respective registers C[0], C[1], C[2], C[3] and V[0], V[1], V[2], V[3]. Finally, a fourth binary adder 309 has one input coupled for receipt of the intermediate multiplication value at the output 307a of the third adder 307 and another input coupled to a register holding the intermediate multiplication value S[m] of a previous datapath cycle of the multiple MAC data path 301. Hence, the output S[m] of the fourth binary adder 309 will either represent another intermediate multiplication value or a result vector element of the M element result vector depending on the current completion state of the multiplication between the N element vector and the first column of the N×M matrix (refer to FIG. 2). This multiplication procedure is terminated when the four last vector input element (comprising V[N−1]) has been multiplied with the four last matrix input element (comprising C[N−1]) as described above leaving the output of the fourth binary adder 309 equal to the first result vector element S[0] of the M element result vector (refer to FIG. 2). Hence, the computation of each result vector element by the multiple MAC data path 301 is effected by executing a plurality of datapath cycles initially computing the above discussed intermediate multiplication values and finally forming the result vector element. The actual number of datapath cycles depends on the value of N and the number of digital multiply-accumulate circuits. In one exemplary embodiment, the value of N is 1024 and the number of digital multiply-accumulate circuits is 4 leading to the execution of 256 datapath cycles for the computation of each of the M result vector elements. Other embodiments of the datapath 301 may comprise a pipeline resulting in a slightly prolonged computation time where the number of datapath cycles equals N/4+([number of pipeline stages]−1) for the computation of each of the M result vector elements. The illustrated data path embodiment 301 includes only a single pipeline stage such that the number of datapath cycles following the above formula becomes N/4+1−1.

The result vector elements of the M element result vector are preferably temporarily stored in a suitable buffer memory (not shown) such as register file or RAM operatively coupled to the output S[m] of the fourth binary adder 309. This buffer memory is preferably held in the vector accelerator 105 such that the complete M element result vector can be transmitted to the data memory of the microprocessor system via the previously discuss data bus port in a single transmission session as discussed in additional detailed below in connection with FIG. 5.

The number of digital multiply-accumulate circuits MAC1-4 of the present vector accelerator 101 has been selected in an optimum manner in view of the given bit width (i.e. the number of data wires) of 32 bits of the data memory bus and the given eight bit width of the matrix input elements. The number of digital multiply-accumulate circuits has been chosen as the bit width of the data memory bus divided by the bit width of each of the matrix input elements=32/4 leading to the illustrated four separate and parellelly operating MACs. The 32 bit capacity of the data memory bus allows the bus to simultaneously hold four matrix input elements in proper order such that these can be written to the four separate matrix input registers C[0], C[1], C[2], C[3] during a single data bus cycle. Hence, providing efficient transfer of the matrix input elements from the single-ported data memory to the vector accelerator 105. Furthermore, since each of vector input elements is represented in a 16 bits format, the 32 bits capacity of the data memory bus allows the bus to simultaneously hold two vector input elements in proper order such that these can be written to two of the four separate vector input registers V[0], V[1], V[2], V[3] during a single data bus cycle. Hence, all four vector input elements written to the vector accelerator 105 occupying only two data bus cycles.

Figures 4A, 4B:
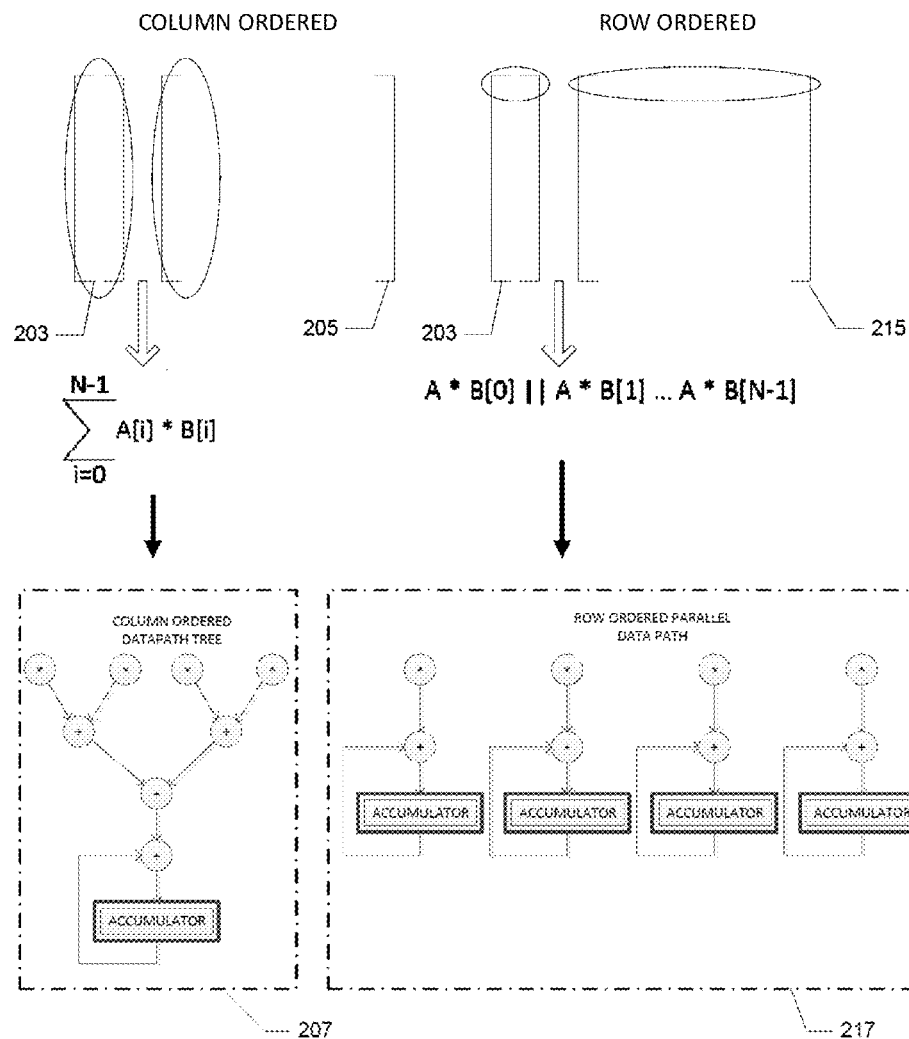

FIG. 4A) is a schematic illustration of the previously discussed column ordered organization of the matrix input elements C[0], C[1], C[2], C[3] and the corresponding MAC datapath topology or tree 207. The four separate MACs, MAC1-4, are located at the topmost portion of the datapath schematic and the final or fourth adder 309 is represented by the "ACCUMULATOR" and the lowermost portion. For comparison, FIG. 4B) is a schematic illustration of the previously discussed alternative row ordered organization of the matrix input elements C[0], C[1], C[2] and C[3] and the corresponding MAC datapath topology or tree 217. The four separate MACs, MAC1-4, are located at the topmost portion of the datapath schematic while a total of four adders is used at the datapath output as indicated by the "ACCUMULATOR" at the lowermost portion of the schematic.

Comparing the column ordered and row ordered data path topologies 207 and 217, respectively, a number of important features are evident: The column ordered topology uses only a single local accumulator/adder independent of the number of parallel MACs while the row ordered topology uses one local accumulator/adder per MAC. For the column ordered topology the number of separate adders in the adder tree can be optimized using design features from digital multiplier designs by building a carry-save (CS) or compression adder tree. For the row ordered topology these design features cannot be exploited to reduce the complexity and die area of the adder tree. Hence, the column ordered topology of the data path is generally used, where the number of parallel MACs is relatively large for example exceeding 3.

Figure 5:
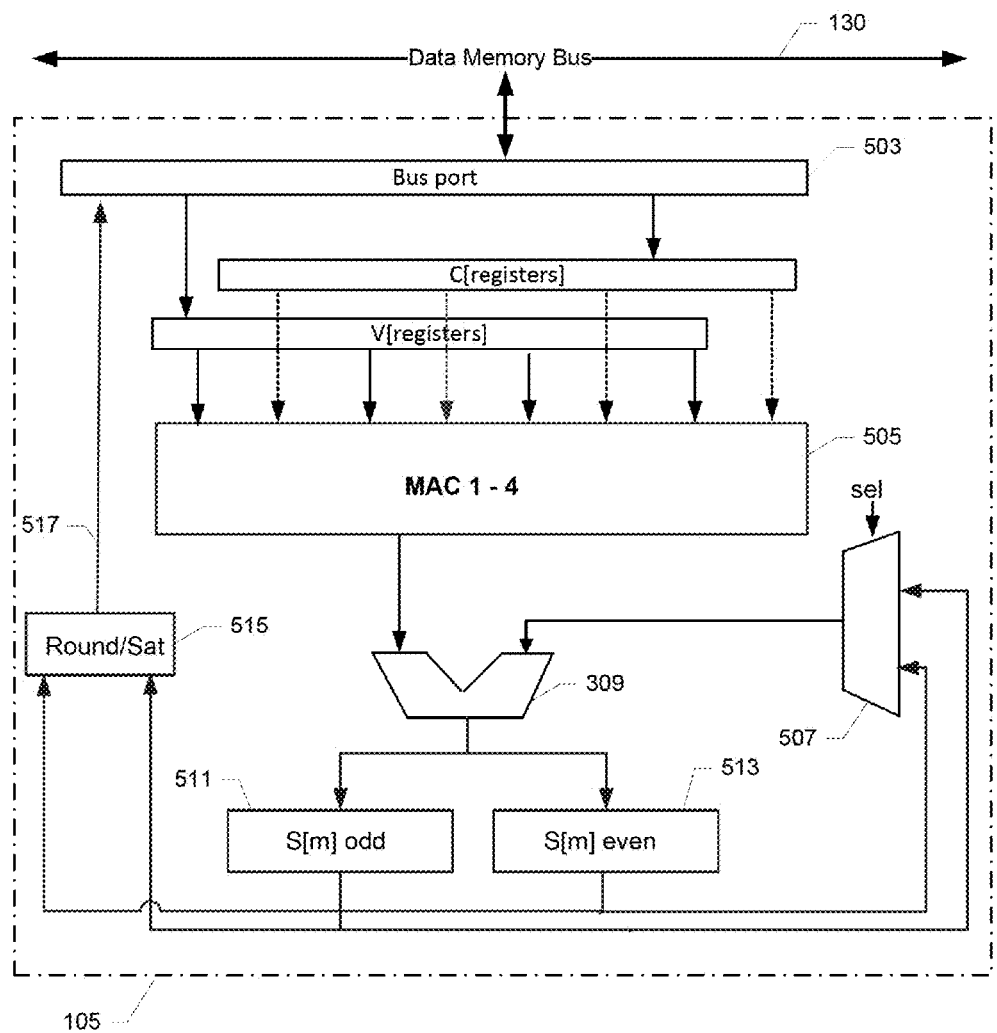
FIG. 5 is a simplified schematic block diagram of the vector matrix product accelerator in accordance with one example embodiment.

FIG. 5 is a simplified schematic block diagram of a vector matrix product accelerator 105 in accordance with one example embodiment thereof. The vector accelerator 105 comprises the previously discussed multiple MAC data path which is formed by the multiple MAC circuit 505, the final binary adder 309, the four vector input registers V[0], V[1], V[2], V[3] indicated as V[registers] and the matrix input registers C[0], C[1], C[2], C[3] indicated as C[registers]. The number of vector input registers and matrix input registers may be tailored to the number of parallel MACs of the multiple MAC data path such that every MAC is supplied with respective vector input elements and matrix input elements before execution of a data path multiplication cycle.

The vector accelerator 105 comprises the previously discussed data bus port 503, which provides a data interface, or I/O port between the multiple MAC data path and the data memory bus 130, which is coupled to the single-ported data memory 103. The respective operations of the circuit blocks of the vector accelerator 105 such as the data bus port 503, the vector input registers, the matrix input registers, the multiple MAC data path etc. are controlled by an appropriately configured logic state machine or controller (not shown). In the present embodiment, the controller is furthermore configured to fetch the above-mentioned vector input elements and matrix input elements of the M×N matrix from the designated memory spaces of the single ported data memory 103 through the data bus port 503 without any intervening action by the microprocessor core 101. In addition, the controller is configured to write the result vector elements of the M element result vector to a predetermined address space of the single-ported data memory 103 allocated for holding the result vector elements. For these purposes, the controller comprises a number of pointer registers (not shown) holding respective pointer addresses to the above mentioned vector input elements, matrix input elements and result vector elements allowing the controller to read out or write the above input/output data by reference to the memory addresses indicated by the pointer addresses. The respective pointer addresses to the above mentioned input and output memory spaces or addresses may be written to the pointer registers by the microprocessor core in connection with an initialization procedure executed by the microprocessor core during microprocessor system power-on or boot. Alternatively, the pointer addresses may be written by the microprocessor core in connection with an initialization routine for a particular application or software routine utilizing the vector matrix product accelerator 105.

In addition to the previously discussed circuit blocks, the vector accelerator 105 comprises a rounding and saturation circuit 515 coupled to outputs of a segmented buffer memory, which comprises simultaneously operable first and second separate single-ported memory segments 511, 513. The first memory segment 511 is configured for storing odd numbered result vector elements, i.e. S[1], S[3] etc. and the second memory segment 513 is configured for storing even numbered result vector elements, i.e. S[0], S[2] etc. The input of the rounding circuit portion 515 receives the result vector elements from the segmented buffer memory and generates corresponding rounded values of the result vector elements. It should be noted that each of the computed result vector elements may be represented and stored in a predetermined bit width that is significantly larger than the combined bit widths of the matrix input element and the vector input element due to the often large number of accumulative additions of intermediate multiplication values performed by the multiple MAC data path during computation of each result vector element as discussed above. Generally, the bit width (P) of each result vector element may be about:

X+Y+Log$_2$(Number of accumulative additions) to avoid losing any numerical precision of the result vector element, where Y is the bit width of each matrix input element, X is the bit width of each vector input element and N is the number of rows of the N×M matrix. Hence, the present embodiment where X=8, Y=16 and N=1024 has a bit width of the result vector elements of: 8+16+Log$_2$(1024)=34.

The rounding and saturation circuit 515 may be configured to round this initial 34 bit width representation of the result vector elements by truncating the result vectors to a smaller bit width for example to 32 bits or 16 bits. The truncated result vector elements can be transmitted to, and stored in, the single ported data memory using less power and fewer data bus cycles compared to the initial result vector elements. The saturation circuit portion may be used to prevent undesired numerical 'wrap-around' effects caused by overflow or underflow of the result vector elements during read out from the segmented buffer memory. The saturation circuit may limit maximum and minimum values of the result vector elements to stay within certain pre-set bounds. In one embodiment, the saturation circuit may comprise upper and lower saturation threshold and saturate input for receipt of the result vector elements. The saturation circuit is configured for generation of saturated values of the result vector elements in accordance with the upper and lower saturation thresholds. The rounded or saturated result vector elements are transmitted from an output of the rounding and saturation circuit 515 via data bus 517 to the data bus port 503, which in turn handles the writing of the rounded or saturated result vector elements to the previously discussed predetermined or known address space of the single-ported data memory 103.

The first and second separate single-ported memory segments 511, 513 of the segmented buffer memory are used by the controller alternatingly store odd and even order result vector elements. The controller uses the select input, sel, of the dual input multiplexer 507 to determine whether the previous intermediate multiplication value supplied to the second adder input of the final adder 309 is taken from the first single-ported memory segment 511 or the second single-ported memory segment 513. The first and second single-ported memory segment 511, 513, respectively, may comprise respective register files or respective RAMs or any other suitable type of digital memory. The use of the first and second separate single-ported memory segments 511, 513 for storage of odd and even order result vector elements removes the need for a dual-ported type of memory device for supporting simultaneous writing and reading of result vector data to the buffer memory. The segmented buffer memory design or architecture allows the controller to write intermediate multiplication values, and the final result vector element, of an even or odd order result vector element to one memory segment while reading out opposite result vector elements of the other memory segment for further processing for example in the rounding and saturation circuit 515. The segmented buffer memory design is used if neither the vector input elements nor the matrix input elements are buffered locally in vector accelerator 105. However, in the previously discussed column ordered organization of the matrix input elements, the vector input elements are preferably stored locally in the vector accelerator 105 such that the segmented buffer memory 511, 513 is replaced by a local accumulator.

During multiplication of the N element vector and the M×N matrix, the following sequence can be executed under control of the controller: the four vector input elements of the N element vector are read from the designated address space, as indicated by the previously discussed data pointer, of the single-ported data memory in the known vector element order through the data bus port 503. The four vector input elements are temporarily stored in the respective vector input registers V[registers] in the appropriate representation in terms of bit width and numerical format for example 16 bit integers or 32 bit integers. The four matrix input elements of the first column of the M×N matrix are read from the designated address space, again using the previously discussed data pointer, of the single-ported data memory in the known matrix element order through the data bus port 503. The four matrix input elements are temporarily stored in the respective matrix input registers C[registers] in the appropriate representation in terms of bit width and numerical format for example 8 bit integers or 16 bit integers. During a first multiplier or multiplication cycle, the first vector input element and the first matrix input element are subsequently applied to the multiplier and multiplicand inputs, respectively, (or vice versa) of the first MAC (refer to FIG. 3). Simultaneously, the residual pairs of vector input elements and the matrix input elements are applied to respective inputs of the residual MACs 2-4 in a corresponding manner such that all MACs are operating simultaneously or parellelly to compute respective intermediate multiplication values. These intermediate multiplication values are subsequently added or summed by an adder circuit or adder tree comprising the previously discussed adders 307, 309 in the present embodiment to produce a first intermediate multiplication value S[m]. The intermediate multiplication value S[m] is temporarily stored in the segmented memory. This multiplication or multiplier cycle is subsequently repeated a plurality of times for respective sets of four successive new vector input elements and four new matrix input elements until all N vector input elements of the N element vector and all matrix input elements of the first column have been traversed and the value of the first result vector element (S[0] on FIG. 2) computed. In the present embodiment that comprises 1024 vector input elements, and where four vector input elements are multiplied during each multiplier cycle, a total of 256 multiplier cycles are used to compute a single result vector element.

The above-described multiplication cycles for the computation of the first result vector element are thereafter repeated M−1 times for the M−1 residual columns of the M×N matrix to compute the residual M−1 result vector elements. As previously mentioned, the first result vector element is preferably written to the buffer memory for temporary storage and the same applies to the residual result vector elements. Hence, a complete M element result vector is temporarily stored in the buffer memory before read-out, optionally followed by rounding and/or saturation, and transmission of the M result vector elements to the designated memory space, as indicated by the previously discussed data pointer to the result vector, of the single-ported data memory through the data bus port 503.

Figure 6:
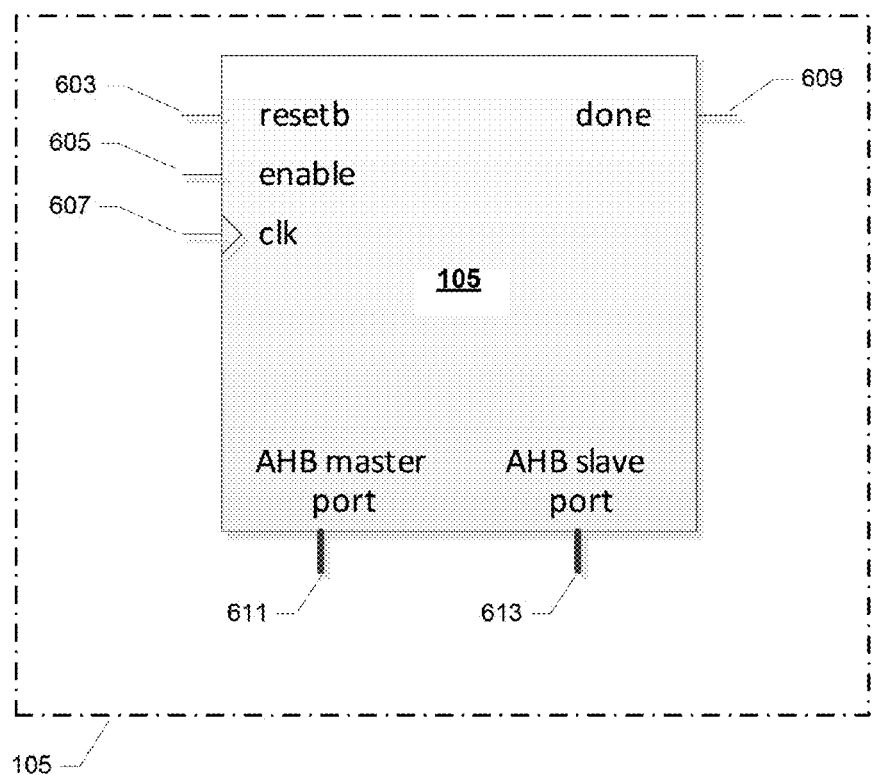
FIG. 6 is a schematic boundary and interface view of the vector matrix product accelerator in accordance with one example embodiment thereof.

FIG. 6 is a schematic boundary and interface view of the vector matrix product accelerator 105 in accordance with one example embodiment thereof. The schematic boundary view illustrates the preferred interface in terms of control signals and data I/O between the vector accelerator 105, the microprocessor core 101 and single-ported data memory 103. The vector accelerator 105 comprises an active low reset input 603 providing global reset of the digital blocks of the vector accelerator 105 such as the vector input registers, matrix input registers, binary adders and various configuration registers and other memory elements. An enable input 605 of the vector accelerator 105 is coupled to a clock gating circuit (not shown) of a clock network of the vector accelerator. By holding the enable input low, the microprocessor core can interrupt or halt the operation of the vector accelerator 105 by disabling clock signals to the digital blocks of the vector accelerator 105. This reduces power consumption of the vector accelerator 105 when it is unused. The vector accelerator 105 further comprises a clock input from which the above discussed clock signals to the digital blocks of the vector accelerator 105 are derived. Hence, the clock signal supplied at the clock input 607 functions as a system clock of the vector accelerator 105 making its operation independent of the availability of clock signals through the previously discussed data bus port, which in the present embodiment comprises an ABH master port 611 and an ABH slave port 613. The ABH master port 611 may be connected to a memory arbiter of the microprocessor core and to the previously discussed data memory bus and single-port data memory of the microprocessor system. The ABH slave port 613 may be used by the microprocessor core to gain access to write to certain control registers of the vector accelerator 105 such as the previously discussed pointer registers. The AHB slave port 613 may comprise various types of suitable control ports, e.g. Advanced Peripheral Bus (APB) or direct register control. The AHB slave port 613 is preferably used to initialize or setup various data pointers, initiate multiplications of the vector accelerator 105 and generally configure the functionality of one or more writeable sub-circuit(s) of the vector accelerator 105 such as the rounding and saturation circuit 515. The vector accelerator 105 finally comprises a done output 609, which signals completion of the computation of an M element result vector. This done output 609 is preferably coupled to the microprocessor core 101 allowing the latter to read and process the M element result vector from the allocated memory space. The done output 609 may be coupled to a suitable data port of the microprocessor core 101 for signaling purposes for example to an interrupt input port.

Figure 7:
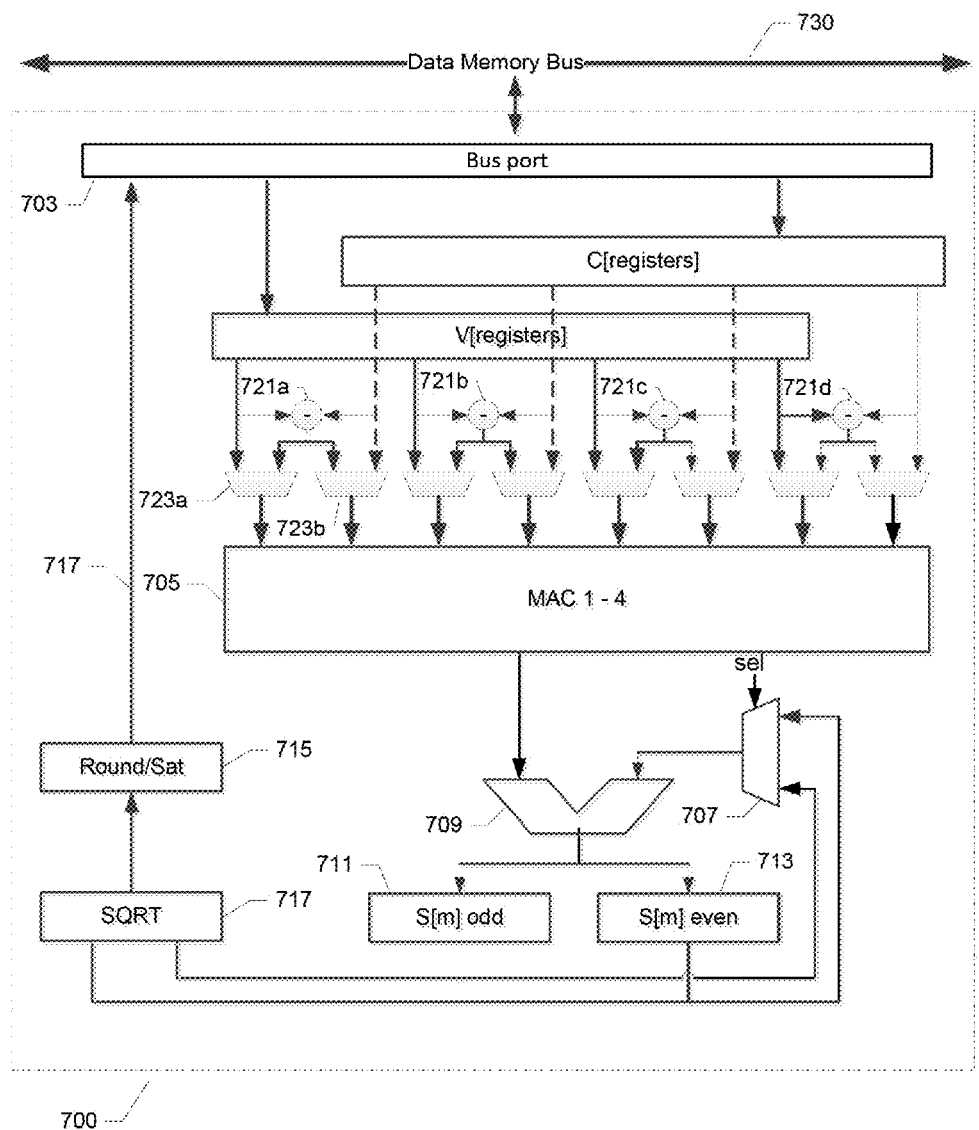
FIG. 7 is a simplified schematic block diagram of a vector matrix product accelerator comprising support for Euclidian distance computation in accordance with a second example embodiment of the disclosure.

FIG. 7 is a simplified schematic block diagram of a vector matrix product accelerator 700 comprising support for Euclidian distance computation in accordance with a second example embodiment of the disclosure. The present vector matrix product accelerator 700 shares numerous features with the previously discussed vector accelerator 105 in connection with FIG. 5 and corresponding features have been provided with corresponding reference numerals to ease comparison. Euclidian distance calculations typically consume considerable numerical processing resources when executed on existing microprocessor cores. This resource consumption is inter alia caused by the fact that Euclidian distance calculations involve a subtraction operation followed by a multiplication operation. This sequence tends to break the data flow of traditional DSP cores that are designed for performing a sequence with multiplication followed by addition. To support the subtraction operation Euclidian distance calculations, the vector matrix product accelerator 705 comprises a plurality of subtraction circuits or units 721a-d arranged before the multiple MAC circuit 705. Each of the subtraction circuits or units 721a-d is arranged to receive and subtract respective pairs of matrix and vector input elements from the V[registers] and the C[registers]. Each subtraction result is inputted to respective first inputs of a pair of adders 723a, 723b while the second inputs of the adders receive the vector input element and the matrix input element, respectively. The outputs of each pair of adders, such as the adders 723a, 723b, are applied to the multiplicand and multiplier inputs of a multiplier of the multiple MAC circuit 705. Finally, an optional SQRT circuit 717 has been arranged in front of a rounding and saturation circuit 715 to support the finalizing square root operation of the Euclidian distance calculation. It is worthwhile to notice that while the addition of the SQRT circuit 717 consumes semiconductor die area when seen in isolation, the SQRT circuit 717 also reduces the number of bits used to represent the result vector elements in rounding and saturation circuit 715, which reduces the size of the latter circuit and saves, die area.

In the discussions of the embodiments above, the capacitors, clocks, adders, memories, busses, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus and systems described above may also be implemented with respect to the method or process described herein and specifics in the examples may be used anywhere in one or more embodiments.

In a first example, a system and a method are provided (that can include any suitable circuitry, adders, capacitors, resistors, inductors, buffers, memories, busses, logic gates, software, hardware, links, etc.) that can be part of any type of computer, which can further include a circuit board coupled to a plurality of electronic components. The system and method can be associated with operating a vector matrix product accelerator of a microprocessor circuit to multiply an N element vector and an M×N matrix. The system can include means for fetching a plurality of vector input elements of the N element vector from a data memory, wherein the vector input elements are stored in a first predetermined address space in a predetermined vector element order. The system can also include means for storing the vector input elements in respective vector input registers, wherein each vector input element is represented by a first predetermined number of bits (X). The system can also include means for fetching a plurality of matrix input elements of the M×N matrix from of the data memory, wherein the plurality of matrix input elements are stored in a second predetermined address space in a predetermined order. The system can also include means for storing the plurality of matrix input elements in respective matrix input registers, wherein each matrix input element is represented by a second predetermined number of bits (Y).

The system can also include means for applying respective pairs of vector input elements and matrix input elements to a plurality of digital multiply-accumulate circuits, means for multiplying the respective pairs of vector input elements and matrix input elements by the plurality of digital multiply-accumulate circuits to produce an intermediate multiplication value; means for performing a plurality of multiplier cycles for successive vector input elements of the N element vector and successive matrix input elements of the M×N matrix to compute a plurality of intermediate multiplication values; and means for adding the plurality of intermediate multiplication values in a binary adder circuit to produce a result vector element of an M element result vector.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A vector matrix product accelerator circuit for improving multiplication throughput of a processor, the vector matrix product accelerator circuit comprising:
   an input/output port interfacing with a data memory bus, wherein the data memory bus couples a processor core to a data memory for storing vector input elements of a vector and matrix input elements of a matrix;
   vector input registers for storage of vector input elements received through the input/output port;
   matrix input registers for storage of matrix input elements received through the input/output port;
   multipliers for producing intermediate multiplication values based on input vector elements and matrix input elements;
   a sequencer for triggering the multipliers to execute successive multiplication cycles for successive subsets of the vector input elements of the vector and successive subsets of the matrix input elements of the matrix; and
   an adder circuit for summing the intermediate multiplication values computed through respective multiplier cycles to produce a particular result vector element of a result vector representing a result of multiplying the vector and the matrix.

2. The vector matrix product accelerator circuit of claim 1, wherein the multipliers comprises:
   respective multiplicand inputs coupled to the respective vector input registers for receipt of respective vector input elements; and
   respective multiplier inputs coupled to the matrix input registers for receipt of respective matrix input elements.

3. The vector matrix product accelerator circuit of claim 1, wherein:
   the successive subsets of the vector input elements of the vector are successively stored temporarily in the vector input registers; and
   the successive subsets of the matrix input elements of the vector are successively stored temporarily in the matrix input registers.

4. The vector matrix product accelerator circuit of claim 1, wherein the data memory is configured to store the matrix input elements of the matrix in column order such that matrix input elements of each column of the matrix are held in consecutive memory locations.

5. The vector matrix product accelerator circuit of claim 1, wherein the vector matrix product accelerator further comprises a buffer memory coupled to the adder circuit for receipt and temporary storage of at least one result vector element of the result vector.

6. The vector matrix product accelerator circuit of claim 5, wherein the buffer memory is configured for temporary storage of all result vector elements of the result vector.

7. The vector matrix product accelerator circuit of claim 5, wherein the buffer memory comprises one of a register file and a dual-ported RAM memory.

8. The vector matrix product accelerator circuit of claim 5, wherein an output of the buffer memory is coupled to the input/output port, interfacing the data memory bus to the vector matrix product accelerator circuit, to transmit the at least one result vector element to the input/output port.

9. The vector matrix product accelerator circuit of claim 5, wherein:
   the buffer memory comprises simultaneously operable first and second separate single-ported memory segments;
   the first memory segment is configured for storing odd numbered result vector elements; and
   the second memory segment is configured for storing even numbered result vector elements.

10. The vector matrix product accelerator circuit of claim 9, further comprising:
    a multiplexer comprising a multiplexer output coupled to an input of the adder circuit, wherein the multiplexer has a first input coupled to a data read/write port of the first memory segment and a second input coupled to a data read/write port of the second memory segment.

11. The vector matrix product accelerator circuit of claim 1, wherein the vector matrix product accelerator further comprises a rounding circuit comprising a rounder input for receipt of the result vector elements of the result vector and generation of corresponding rounded values of the result vector elements.

12. The vector matrix product accelerator circuit of claim 1, further comprising:
    upper and lower saturation thresholds; and
    a saturate input for receipt of the result vector elements and generation of saturated values of the result vector elements in accordance with the upper and lower saturation thresholds.

13. The vector matrix product accelerator circuit of claim 1, wherein:
    the sequencer triggers multiplication cycles until all vector input elements of the vector and all matrix input elements of a particular column of the matrix have been traversed to produce the particular result vector element.

14. The vector matrix product accelerator of claim 1, further comprising:
    subtraction circuits for receiving and subtracting respective pairs of matrix and vector input elements from the matrix input registers and the vector input registers; and
    adders, wherein each subtraction result from the plurality of subtraction circuits is inputted to respective first inputs of each pair of adders, and second inputs of each pair of adders receive the vector input element and the matrix input element, respectively;
    wherein the multipliers comprises respective multiplicand inputs and respective multiplier inputs, and outputs of each pair of adders are applied to the multiplicand inputs and the multiplier inputs of the multipliers to produce respective intermediate multiplication values.

15. The vector matrix product accelerator of claim 14, further comprising:
    a square root circuit for performing a square root operation of an Euclidian distance calculation;
    upper and lower saturation thresholds; and
    a saturate input coupled to the output of the square root circuit for generating saturated values of the result vector elements in accordance with the upper and lower saturation thresholds.

16. A microprocessor circuit, the circuit comprising:
    a microprocessor core coupled to a data memory via a data memory bus;
    the data memory configured for storage of vector input elements of a vector and storage of matrix input elements of a matrix; and
    a vector matrix product accelerator comprising a data path for off-loading the microprocessor core from repetitive multiplication operations associated with multiplying the vector and the matrix to compute a result vector, the vector matrix product accelerator comprising:
    vector input registers for storage of vector input elements received through the input/output port;
    matrix input registers for storage of matrix input elements received through the input/output port;

multipliers for producing intermediate multiplication values based on input vector elements and matrix input elements;

a sequencer for triggering the multipliers to execute successive multiplication cycles for successive subsets of the vector input elements of the vector and successive subsets of the matrix input elements of the matrix; and an adder circuit for summing the intermediate multiplication values computed through respective multiplier cycles to produce a particular result vector element of the result vector.

17. The microprocessor of claim 16, wherein the microprocessor core, the data memory, and the vector matrix product accelerator are integrated on a common semiconductor die or substrate.

18. The microprocessor of claim 16, wherein:
the data memory bus comprises a predetermined integer number of data wires; and
the predetermined integer number of data wires divided by a first predetermined number of bits of each of the matrix input elements is an integer.

19. The microprocessor of claim 18, wherein the predetermined integer number of data wires is selected from a group of {16, 32, 64, 128}, and wherein each of the matrix input elements is represented by 8 bits such that the number of multipliers is one of 2, 4, 8 and 16.

20. The microprocessor of claim 18, wherein the predetermined integer number of data wires is selected from a group of {16, 32, 64, 128} and each of the matrix input elements is represented by 16 bits such that the number of multipliers becomes one of 2, 4 and 8.

21. The microprocessor of claim 18, wherein:
the number of multipliers substantially equals the predetermined integer number of data wires divided by the first predetermined number of bits.

22. The microprocessor of claim 16, wherein the data memory is a single-ported data memory.

23. A method for improving multiplication throughput of a processor, comprising:
fetching a subset of vector input elements of a vector from a data memory, wherein the vector input elements are stored in a first predetermined address space in a predetermined vector element order;
storing the subset of vector input elements in respective vector input registers;
fetching a subset of matrix input elements of a matrix from the data memory, wherein the plurality of matrix input elements are stored in a second predetermined address space in a predetermined order;
storing the subset of matrix input elements in respective matrix input registers;
applying respective pairs of vector input element and matrix input element to multipliers;

performing, by the multipliers, a plurality of multiplier cycles for successive subsets of vector input elements of the vector and successive subsets of matrix input elements of the matrix to compute a plurality of intermediate multiplication values by repeating the fetching, storing, and applying steps; and adding the plurality of intermediate multiplication values in an adder circuit to produce a particular result vector element of a result vector.

24. The method of claim 23, wherein:
performing the plurality of multiplier cycles comprises performing a number of multiplier cycles until all vector input elements of the vector and all matrix input elements of a particular column of the matrix have been traversed to produce the particular result vector element.

25. The method of claim 23, further comprising:
writing at least one result vector element of the result vector from the adder circuit to a buffer memory for temporary storage.

26. The method of claim 23, further comprising:
writing result vector elements of the result vector from the adder circuit to the buffer memory for temporary storage of a complete result vector.

27. The method of claim 23, further comprising:
writing the result vector elements of the result vector from the buffer memory to a data memory bus through an input/output port; and
storing the result vector elements in a third predetermined address space of the data memory.

28. The method of claim 23, wherein:
the subset of matrix input elements and the subset of vector input elements are fetched through a data memory bus coupled to the data memory;
the data memory bus comprises a predetermined integer number of data wires; and
the number of multipliers operating in parallel substantially equals the predetermined integer number of data wires divided by a first predetermined number of bits of each of the matrix input elements.

29. The method of claim 23, further comprising:
writing the matrix input elements of each column of the matrix to the second predetermined address space in column order such that the matrix input elements of each of the columns are held in consecutive memory locations of the second predetermined address space.

30. The method of claim 23, wherein the matrix corresponds to neural net coefficient matrices associated with neural network nodes.

31. The method of claim 23, wherein the vector comprises cepstrum or cepstral values associated with a voice recognition system.

* * * * *